United States Patent [19]

Milutzki et al.

[11] 4,300,228
[45] Nov. 10, 1981

[54] PICKUP ARM CONTROL MECHANISM AND ELECTRICAL CIRCUITRY THEREFORE

[75] Inventors: Udo Milutzki; Dietwald Schotte, both of Walldorf, Fed. Rep. of Germany; Jeffrey Johnson, New Orleans, La.

[73] Assignee: Braun Aktiengesellschaft, Kronberg, Fed. Rep. of Germany

[21] Appl. No.: 198,478

[22] Filed: Oct. 20, 1980

Related U.S. Application Data

[63] Continuation of Ser. No. 934,074, Aug. 16, 1978, abandoned.

[30] Foreign Application Priority Data

Aug. 19, 1977 [DE] Fed. Rep. of Germany ....... 2737387

[51] Int. Cl.³ .................................... G11B 17/00
[52] U.S. Cl. ....................................... 369/216
[58] Field of Search ............... 369/221, 228, 230, 216

[56] References Cited

U.S. PATENT DOCUMENTS 3,993,315 11/1976 Hansen et al. .................. 274/9 R

FOREIGN PATENT DOCUMENTS 2413972 3/1972 Switzerland ..................... 274/23 R
1136130 9/1962 Fed. Rep. of Germany .... 274/13 R Primary Examiner—Harry N. Haroian
Attorney, Agent, or Firm—Fishman and Van Kirk

[57] ABSTRACT

A control mechanism for automatically raising, swinging and lowering the pickup arm of a record player in response to the positioning of a finger of a user. The user's finger will selectively bridge pairs of contacts to establish an electrical circuit and generate an input signal to logic circuitry. The logic circuitry provides control signals which, through suitable transducers, control the motion of the arm.

12 Claims, 5 Drawing Figures

U.S. Patent  Nov. 10, 1981  Sheet 1 of 3  4,300,228
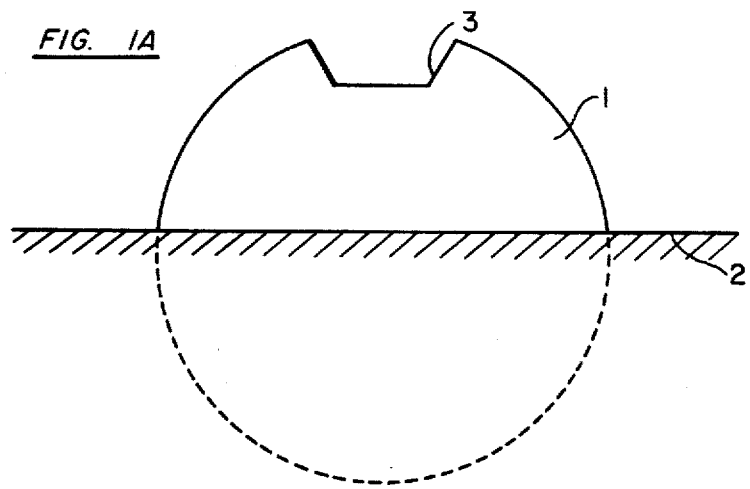
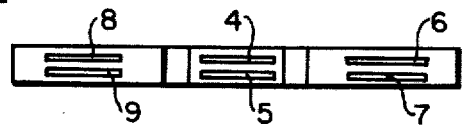
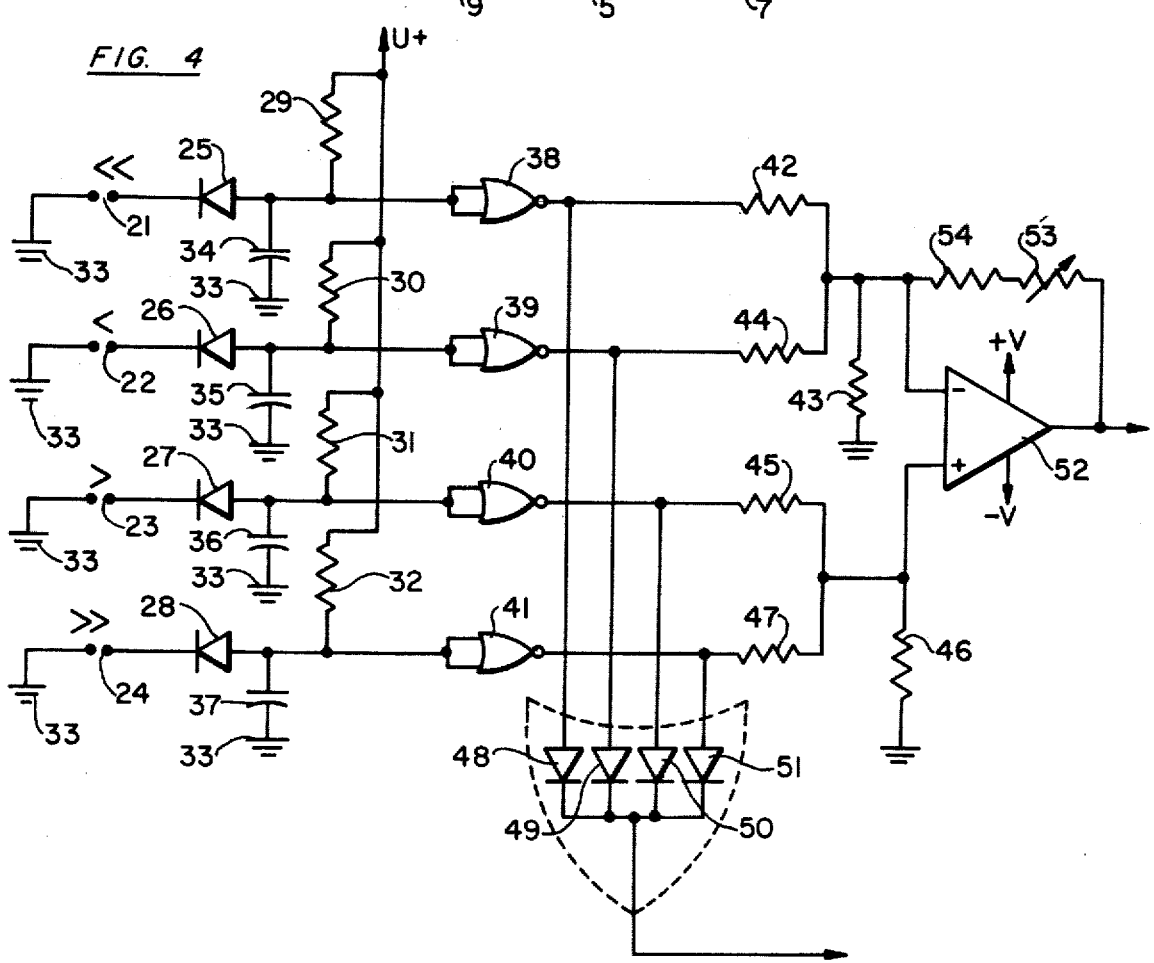

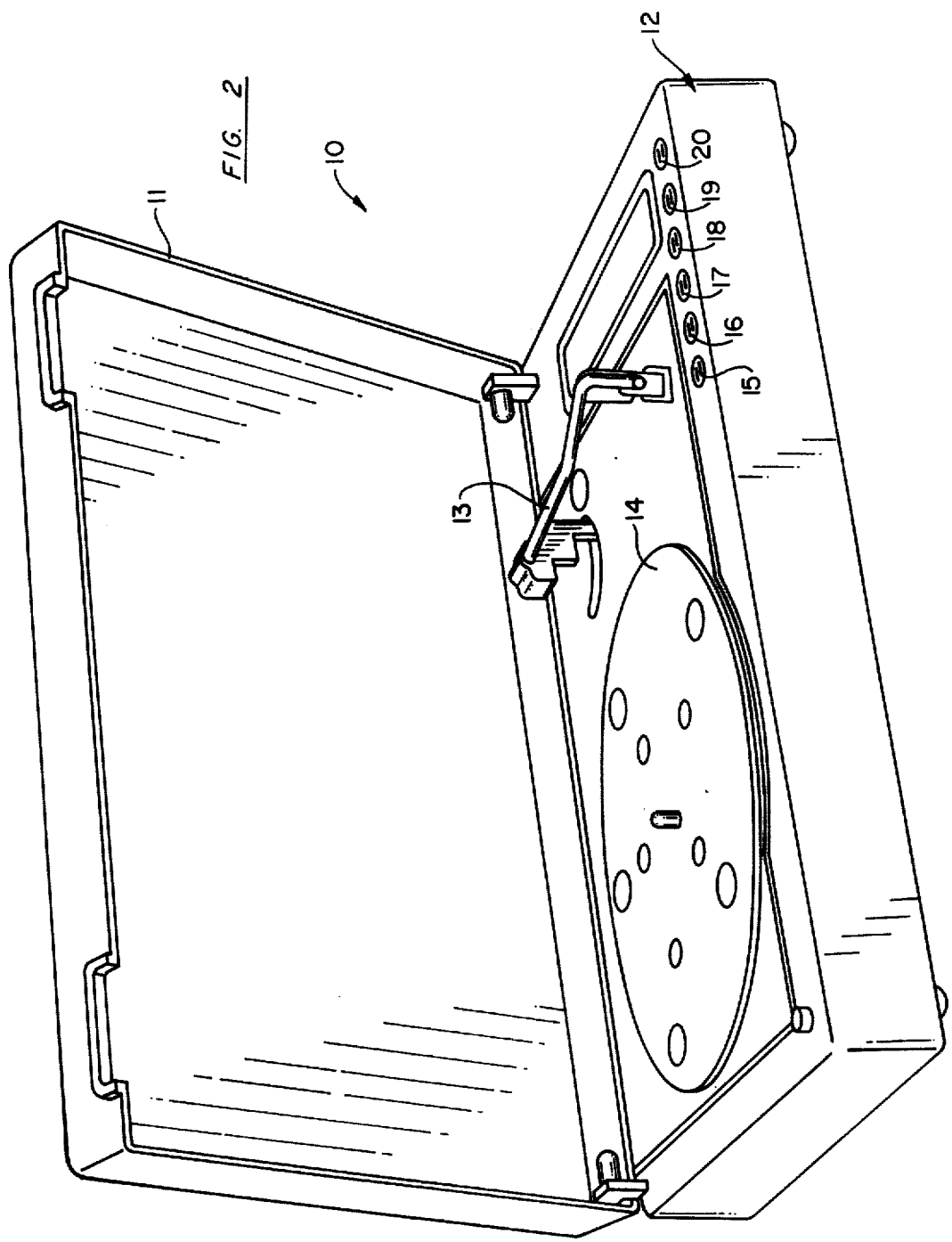

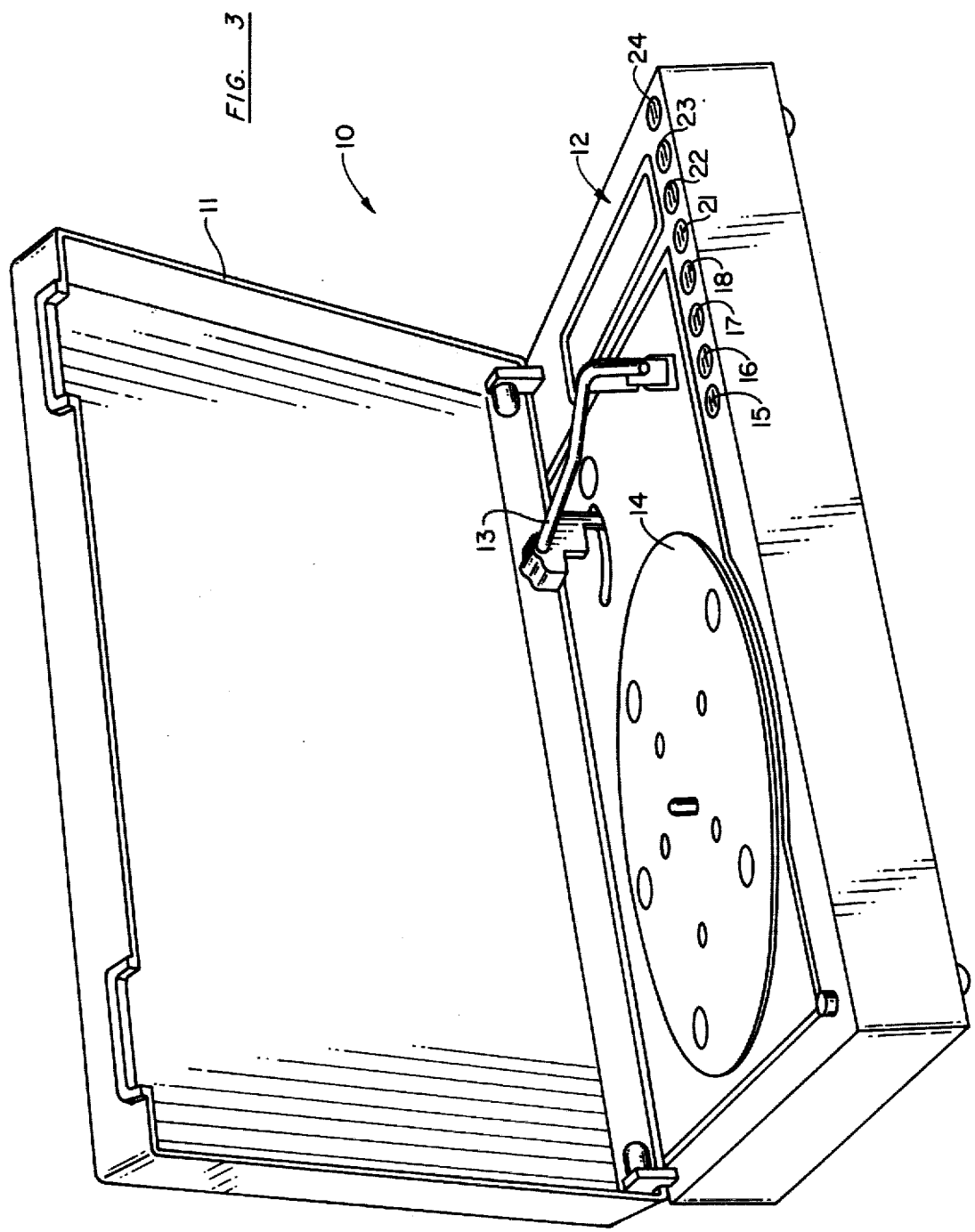

PICKUP ARM CONTROL MECHANISM AND ELECTRICAL CIRCUITRY THEREFORE

This is a continuation of application Ser. No. 934,074 filed Aug. 16, 1978 now abandoned.

BACKGROUND OF THE INVENTION (1) Field of the Invention

The present invention relates to record players. More particularly, the present invention relates to a positioning control for the tone arm of a record player. Furthermore, the present invention relates to a control for use with the apparatus disclosed in U.S. patent application Ser. No. 886,455 filed Mar. 14, 1978 entitled "Control Mechanisms for Pick-Up Arms of Record Players."

(2) Description of the Prior Art

A person playing a record often desires to select a particular portion of the record. It is the common practice to have a cuing mechanism which raises and lowers the pickup arm, and the pickup arm is swung manually inwardly and outwardly with respect to the record.

It is an object of the present invention to provide a control mechanism for raising, swinging and lowering the pickup arm of a record player. The control mechanism providing for automated raising, swinging and lowering of the pickup arm.

SUMMARY OF THE INVENTION

The present invention provides a control mechanism for raising, swinging and lowering the pickup arm of a record player. In one embodiment of the invention, the control mechanism comprises a disc which is rotatable, rotation of the disc providing for swinging of the pickup arm. U.S. patent application Ser. No. 886,455 filed Mar. 14, 1978 may be referred to for a more detailed description of the swinging of the pickup arm. The disc includes a finger depression which allows for the interfitting of the finger of a person operating the record player. The disc includes at least three sensors, each sensor including a pair of electrodes which may be bridged by the user's finger. When a finger is placed in the depression, one sensor is activated by the bridging of a pair of electrodes by the finger and an electrical signal is generated. This electrical signal operates through logic circuitry to cause the pickup arm to be raised. Contacting the second sensor will cause the pickup arm to remain in its raised condition, even when the finger is removed from contact with the second sensor. In order to permit the pickup arm to be lowered, a third sensor is provided. If this sensor is contacted, the pickup arm is lowered.

In another embodiment of the invention, the control comprises at least three sensors, the first sensor providing for raising of the pickup arm and inward swinging of the pickup arm. The second sensor provides for raising of the pickup arm and outward swinging of the pickup arm. The third sensor provides for lowering of the pickup arm.

In still another embodiment of the invention, a control for swinging the pickup arm at various speeds is provided. In this embodiment of the invention, five contact sensors are provided. The first contact sensor provides for raising of the pickup arm and inward swinging of the pickup arm at a first speed, the second sensor providing for raising of the pickup arm and inward swinging of the pickup arm at a second speed. If both the first and the second contact sensors are actuated, the speed of the inward swing of pickup arm 13 is increased to a speed which is preferably the sum of the first and second speeds. The third contact sensor provides for the raising of the pickup arm and the outward swinging of the pickup arm at a third speed. The fourth contact sensor provides for the raising of the pickup arm and the swinging of the pickup arm in an outward direction at a fourth speed. If both the third and fourth sensors are contacted, the outward swinging speed increases, preferably additively. A fifth contact sensor provides for lowering of the pickup arm. If a contact sensor providing for outward swinging and a contact sensor providing for inward swinging are contacted simultaneously, the lessor speed is subtracted from the greater speed to thereby provide a pickup arm which swings in a particular direction with a relatively low speed. Restated, the swinging speeds of the four contact sensors are additive and the direction of the inward swinging is considered positive and the direction of the outward swinging is considered negative. For example, if a contact sensor resulting in a relatively fast inward swing of the pickup arm is contacted simultaneously with a contact sensor resulting in a relatively low speed the outward swinging of the pickup arm, the result is a relatively slow inward swinging of the pickup arm. Although the present invention is particularly suited for use in record players having four switches which raise and swing the pickup arm, the use of additional switches is contemplated.

BRIEF DESCRIPTION OF THE DRAWING

The present invention may be better understood and its numerous objects and advantages will become apparent to those skilled in the art by reference to the accompanying drawing in which:

FIG. 1a is a side elevation view of a mode selector in accordance with a first embodiment of the invention;

FIG. 1b is a plan view of the apparatus of FIG. 1a;

FIG. 2 is a perspective view of a record player incorporating the present invention and having three sensors for providing tone arm position control signals;

FIG. 3 is a perspective view of a record player including the present invention and having five sensors for raising, swinging and lowering a pickup arm; and FIG. 4 is a schematic diagram of an electrical control circuit in accordance with the present invention.

DESCRIPTION OF THE PREFERRED EMBODIMENT

FIGS. 1a and 1b show a rotary modes selector disc 1 which projects above the chassis 2 of a record player. Selector 1 is in the form of a disc which is provided with a finger receiving depression 3. At least a first sensor, including a pair of electrodes 4 and 5, is located on disc 1 in depression 3 whereby the contacts of the sensor will be bridged upon insertion of the user's finger in depression 3. Selector disc 1 corresponds to the disc shown in FIGS. 1, 2, and 3 of copending U.S. patent application Ser. No. 886,455 filed Mar. 14, 1978.

The bridging of sensor contacts 4 and 5 by the insertion of a user's finger in depression 3 of disc 1 will, in accordance with a first embodiment of the invention, complete an electrical circuit whereby a control signal is generated. This control signal will cause the pickup arm of the record player to move upwardly and remain in the raised position until the finger is removed from depression 3. When the user's finger is removed, the circuit which generates the input signal is broken and the pickup arm is lowered.

In some cases it may be desirable to provide a control which permits the pickup arm to remain in its raised position without the user's finger remaining in the depression 3 in the selector disc 1. To this end, a further sensor, comprising a pair of electrodes 6 and 7, may be provided on the periphery of disc 1. Rotation of the disc can position electrodes 6 and 7 such that they are bridged by conductive material on the record player chassis whereby the control signal which causes raising of the arm will be generated.

In order to permit the pickup arm to be lowered, a third sensor including a pair of electrodes 8 and 9 may also be provided on disc 1. Establishing an electrical circuit between electrodes 8 and 9 will result in the generation of an input signal which, through appropriate circuitry and actuators, will cause the lowering of the pickup arm.

FIG. 2 shows a variant of a control in accordance with the present invention. In FIG. 2 a record player is indicated generally at 10 and includes a lid or dust over 11, a base 12, a tone arm 13 and a turntable 14. Sensors 15, 16 and 17, each of which will typically comprise a pair of spaced electrodes as shown in FIG. 1b, arranged on the top of base 12. If, for example, sensor 15 is contacted its electrode pair are bridged and a control signal which results in turntable 14 rotating at 33 revolutions per minute is generated. Contacting of sensor 16 results in the generation of a control signal which causes turntable 14 to be rotated at 45 revolutions per minute. Bridging the contact of sensor 17 will cause the stopping of turntable 14. If sensors 15 and 16 are simultaneously contacted in such a manner as to cause the generation of input signals, through the use of appropriate logic circuitry, the turntable will be caused to rotate at 45 revolutions per minute and the pickup arm 13 will drop at a position commensurate with a record having a 30 cm diameter being positioned on the turntable. It should be understood that the control can easily be adapted to function at other speeds and with records having other diameters when sensors 15 and 16 are simultaneously contacted.

Sensors 18, 19 and 20 are also provided on the base 12 of record player 10 for the purpose of generating control signals which cause operation of the pickup arm 13. Thus, by way of example, sensor 19 may be employed to control the inward movement of arm 13; i.e., the output signal provided by closing the contacts of sensor 19 will cause pickup arm 13 to be raised and to move toward turntable 14 at a preselected speed. In order to lower the pickup arm onto the record, the sensor 18 may be operated to provide an input signal to the logic circuitry. Pickup arm 13 can be automatically raised by contacting sensor 20 whereupon, in accordance with the embodiment being described, the arm will move outwardly at a preselected speed.

In the embodiment of FIG. 3, the control exercised over arm 13 is such that the arm can be moved at two different speeds as well as at speeds corresponding to the sum and difference of these two precept speeds. Thus, when sensor 21 is operated to provide an input signal, arm 13 will be moved rapidly inwardly. The contacting of sensor 22 will result in a comparatively slow inward movement of arm 13. Sensors 23 and 24 are employed to generate signals which control the outward movement, relative to the turntable of the pickup arm 13; operation of sensor 24 causing a rapid movement and operation of sensor 23 causing a relatively slow movement of the arm. As in the embodiment of FIG. 2, the raised pickup arm 13 can be lowered by contacting sensor 18.

Referring now to FIG. 4, circuitry for use with the sensor arrangement of FIG. 3 is depicted. As shown in FIG. 4, the sensors 21, 22, 23 and 24 each comprise an electrode pair having a first contact thereof connected as indicated at 33. The second electrodes of each sensor pair are connected, via respective diodes 25, 26, 27 and 28, to logic circuitry which will be described below. A voltage source +u is coupled via respective resistors 29, 30, 31 and 32, to each of sensors 21, 22, 23 and 24 via the aforementioned diodes as shown; i.e., the junctions between the resistors and diodes are connected to inputs of the logic circuitry. Capacitors 34, 35, 36 and 37 are connected in parallel with each of the series connected sensor electrode pairs and diodes for noise suppression.

In the disclosed embodiment, the anodes of diodes 25, 26, 27 and 28; i.e., the common junction between the diodes, capacitors and biasing resistors; are connected to inputs of respective NOR gates 38, 39, 40 and 41. In the embodiment being described, where the sensors comprise merely contacts which will be bridged by a user's finger, the NOR gates will comprise high input impedance devices which function as buffers with only a single gate input terminal being employed. The output of NOR gate 38 is connected to ground via series connected resistors 42 and 43. The output of NOR gate 39 is connected to ground via resistor 44 and aforementioned resistor 43. The output of NOR gate 40 is connected to ground via resistors 45 and 46. The output of NOR gate 41 is connected to ground via resistors 47 and 46. The outputs of NOR gates 38 and 39 are coupled to a common point via a pair of back-to-back diodes 48 and 49 whereas the outputs of NOR gates 40 and 41 are also coupled to the aforementioned common point by a pair of back-to-back connected diodes 50 and 51. Thus, in the disclosed embodiment the cathode of each of diodes 48, 49, 50 and 51 is connected to a common point at which a command signal corresponding to a desire to lift the pickup arm will be applied. This common point, which has been labeled "Lift," may be coupled, by way of example, to a hot wire lift or other suitable actuator.

The common junction between resistors 42, 43, and 44 is connected to the negative input terminal of an operational amplifier 52. Amplifier 52 is provided with negative feedback via a variable resistor 53 and a fixed resistor 54. The positive input terminal of amplifier 52 is connected to the common junction of resistors 45, 46 and 47. The output of amplifier 52 is coupled to a suitable actuator for causing rotation of the pickup arm.

The bridging of the contacts of sensor 21 will cause the potential applied to the input of NOR gate 38 to fall whereby the gate output voltage will rise. The "high" output state of gate 38 will be applied, to a suitable actuator as a "lift" command. The output of NOR gate 38 is simultaneously applied, via resistor 42, to the negative input terminal of amplifier 52 whereby amplifier 52 will deliver an output signal which causes a pickup arm to be rotated rapidly toward the turntable.

When the contacts of sensor 22 are bridged, the output voltage of gate 39 will rise and a signal will be developed across resistor 44. Resistor 44 has a higher resistance value than resistor 42. Accordingly, a signal of smaller magnitude than that resulting from the operation of gate 38 will be generated and will be applied to the negative input of amplifier 52. This smaller amplifier input signal will result in the pickup arm being rotated toward the turntable at a slower rate. When both of sensors 21 and 22 are contacted, the voltages across resistors 42 and 44 are added and the sum of the voltage thus generated will be applied to the negative input terminal of amplifier 52 for the purpose of producing a rotational control signal for the arm.

The movement of the pickup arm away from the turntable is controlled in substantially the same manner as described above by causing the generation of signals which are applied to the positive input of amplifier 52; these signals resulting from the operation of gates 40 and 41 as a consequence of bridging the contacts of sensors 23 and 24. Thus, if both of contact pairs 23 and 24 are simultaneously bridged, the inputs to both of gates 40 and 41 will fall, the outputs of the gates will rise and the resulting signals appearing across resistors 45 and 47 will be summed and applied to the positive input of amplifier 52. A current which is opposite in polarity to the current resulting from the application of a signal to the negative input terminal of amplifier 52 will thereupon flow in the amplifier output circuit. Obviously, if a pair of sensors which command movement of the tone arm in opposite directions are contacted, the resulting motion of the pickup arm will be a function of any differential between voltages appearing at the amplifier input terminals.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In apparatus for controlling movements of the tone arm of a record player relative to turntable in response to actions of a user, said apparatus including reversible variable speed actuator means for controlling the speed and direction of rotation of the pickup supporting end of the tone arm in response to command signals, an improved command signal generator comprising:

first command signal generating means, said first signal generating means being responsive to an action of the user for generating a first actuator means command signal, said first command signal indicating the user's desire to cause the tone arm to be raised and moved in a first direction at a first speed;

second command signal generating means, said second signal generating means being responsive to another action of the user for generating a second actuator means command signal, said second command signal indicating the user's desire to cause the tone arm to be raised and moved in the first direction at a second speed;

means connected to said first and second command signal generating means for summing said first and second command signals to generate a third command signal indicating the user's desire to cause the tone arm to be moved in the first direction at a third speed; and means for applying said command signals to a tone arm actuator.

2. The apparatus of claim 1 wherein said command signal generator further comprises:

third command signal generating means, said third signal generating means being responsive to an action of the user for generating a fourth command signal, said fourth command signal indicating the user's desire to cause the tone arm to be raised and moved in a second direction opposite to said first direction at a first speed; and fourth command signal generating means, said fourth signal generating means being responsive to another action of the user for generating a fifth command signal, said fifth command signal indicating the user's desire to cause the tone arm to be raised and moved in the second direction at a second speed.

3. The apparatus of claim 2 further comprising means for summing said fourth and fifth command signals to generate a sixth command signal commensurate with a desire to cause the tone arm to be moved in the second direction at a third speed.

4. The apparatus of claim 2 wherein each of said first, second, third and fourth signal generating means each include a pair of normally open contacts and a logic gate which inverts an input signal applied thereto, the gate input signal being a function of the level of a current flow through said switch means via said contacts.

5. The apparatus of claim 4 wherein said switch means each further comprises:

diode means for coupling the output of said logic gate to a common point whereby the generation of a command signal by any of said switch means will result in the appearance of a command signal at said common point which will cause the raising of the tone arm.

6. The apparatus of claim 5 wherein each of said switch means further includes an element having an impedance commensurate with the desired tone arm speed of movement and wherein said apparatus further comprises operational amplifier means, means connecting a first polarity input terminal of said operational amplifier means to receive signal generated by current flow through the said impedance elements of said first and second switch means whereby said first direction speed signals may be summed at the input to said amplifier means, means connecting a second polarity input terminal of said operational amplifier means to receive signals generated by current flow through said impedance elements of said third and fourth switch means whereby said second direction speed signals may be summed at the input of said operational amplifier means, and means for connecting the output of said operational amplifier means to the actuator for causing rotation of said tone arm.

7. The apparatus of claim 1 wherein each of said first and second signal generating means includes a logic gate which inverts an input signal applied thereto.

8. In apparatus for controlling the movements of the tone arm of a record player relative to a turntable in response to actions of a user, said apparatus including reversible variable speed actuator means for controlling the speed and direction of rotation of the pickup supporting end of the tone arm in response to command signals, an improved command signal generator comprising:

first normally open switch means, said first switch means having a pair of spaced contacts, the impedance bridging of said contacts in response to an action of the user causing the generation of a first command signal commensurate with the user's desire to cause the tone arm to be raised and moved in a first direction at a first speed;

second normally open switch means, said second switch means including a pair of spaced contacts, the impedance bridging of the contacts of said second switch means by another action of the user generating a second command signal commensurate with the user's desire to cause the tone arm to be raised and moved in the first direction at a second speed;

third normally open switch means, said third switch means including a pair of spaced contacts, the impedance bridging of the contacts of said third switch means by an action of the user generating a third command signal commensurate with the user's desire to cause the tone arm to be raised and moved in a second direction opposite to said first direction at a first speed;

fourth normally open switch means, said fourth switch means including a pair of spaced contacts, the impedance bridging of the contacts of said fourth switch means by another action of the user generating a fourth command signal commensurate with the user's desire to cause the tone arm to be raised and moved in the second direction at a second speed; and means coupled to said first, second, third and fourth switch means and responsive to command signals generated by said switch means for generating a fifth command signal, said fifth command signal being commensurate with the combined totals of the directions and speeds of the command signals being generated by any of said first, second, third and fourth switch means.

9. The apparatus of claim 8 wherein each of said switch means includes a logic gate which inverts an input signal applied thereto, input signals being applied to said gates upon establishment of a path for current flow between the contacts of said switch means.

10. The apparatus of claim 9 wherein each of said switch means each further comprises:
diode means for coupling the output of said gate to a common point whereby the generation of a command signal by any of said switch means will result in the appearance of a command signal at said common point which will cause the raising of the tone arm.

11. The apparatus of claim 10 wherein each of said switch means further includes an element having an impedance commensurate with the desired tone arm speed of movement and wherein said apparatus further comprises operational amplifier means, means connecting a first polarity input terminal of said operational amplifier means to receive signals generated by current flow through the said impedance elements of said first and second switch means whereby said first direction speed signals may be summed at the input to said amplifier means, means connecting a second polarity input terminal of said operational amplifier means to receive signals generated by current flow through said impedance elements of said third and fourth switch means whereby said second direction speed signals may be summed at the input of said operational amplifier means, and means for connecting the output of said operational amplifier means to an actuator for causing rotation of said tone arm.

12. In apparatus for controlling the movements of the tone arm of a record player relative to a turntable, said apparatus including controllable actuator means for producing movements of the pickup supporting end of the tone arm in response to command signals, an improved command signal generator comprising:
first means responsive to stimulation by a user for generating a first control signal, said first control signal indicating the users desire to cause the tone arm to undergo a first motion;
second means responsive to stimulation by the user for generating a second control signal, said second control signal indicating the user's desire to cause the tone arm to undergo a second motion different from said first motion;
means connected to said first and second control signal generating means for combining said first and second control signals to produce a third control signal indicating the users desire to cause the tone arm to undergo a third motion which differs from both of said first and second motions;
means for applying the third control signal to the actuator as a first command signal; and
means for delivering at least one said first and second control signals to the actuator as a second command signal.

* * * * *